United States Patent
Frankewich, Jr.

(10) Patent No.: US 6,838,991 B2
(45) Date of Patent: Jan. 4, 2005

(54) METHOD AND APPARATUS FOR TESTING AN ELECTRONIC PET CONTAINMENT TRANSMITTER

(75) Inventor: Walter J. Frankewich, Jr., Maryville, TN (US)

(73) Assignee: Radio Systems Corporation, Knoxville, TN (US)

( * ) Notice: Subject to any disclaimer, the term of this patent is extended or adjusted under 35 U.S.C. 154(b) by 27 days.

(21) Appl. No.: 10/210,454

(22) Filed: Jul. 31, 2002

(65) Prior Publication Data

US 2004/0021574 A1 Feb. 5, 2004

(51) Int. Cl.[7] .................. G08B 23/00; G08B 19/00; G08B 2/00; G08C 17/00; A01K 15/02; A01K 15/04

(52) U.S. Cl. .................. 340/573.1; 340/573.3; 340/870.09; 340/870.28; 119/719; 119/721

(58) Field of Search .................. 340/573.1, 573.3, 340/870.09, 870.28; 119/721, 719

(56) References Cited

U.S. PATENT DOCUMENTS

| 5,353,744 | A | * | 10/1994 | Custer | 119/719 |
| 5,533,959 | A | * | 7/1996 | Newman et al. | 600/28 |
| 6,431,122 | B1 | * | 8/2002 | Westrick et al. | 119/721 |

* cited by examiner

Primary Examiner—Jeffery Hofsass
Assistant Examiner—Lam Pham
(74) Attorney, Agent, or Firm—Pitts & Brittian, P.C.

(57) ABSTRACT

A method and apparatus for testing the proper operation of an electronic pet containment transmitter. The transmitter includes an internal short loop antenna that is used to activate the receiver unit when it is brought into close proximity of the transmitter.

24 Claims, 5 Drawing Sheets

METHOD AND APPARATUS FOR TESTING AN ELECTRONIC PET CONTAINMENT TRANSMITTER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Scope of Invention

The invention relates to an electronic pet containment system. More specifically, a method and apparatus for testing the proper operation of an electronic pet containment transmitter and receiver unit is shown and described.

2. Description of the Related Art

Electronic pet containment systems provide an alternative to conventional fencing for confining an animal to a predetermined location. A typical electronic pet containment system includes a transmitter, a receiver and a wire loop that defines the boundary of the containment area. The wire loop is typically buried around the perimeter of the area where the animal is to be confined. Electronic pet containment systems offer the benefit of being aesthetically pleasing by being virtually unseen and thereby eliminating the need for a physical fence that restricts viewing or is deemed unsightly. Further, an electronic pet containment system serves to restrict ingress to or egress from the bounded area on a pet-by-pet basis. In addition, because the operation of the containment boundary is limited to pets wearing a matched receiver unit and not a physical boundary, the containment system does not restrict people, such as the pet owner, from access to the bounded area.

Because the electronic pet containment system does not utilize a visible boundary, it is impossible to determine whether the boundary is active and functioning properly. Generally, a failure of the boundary results from the failure of the transmitter or a break in the wire loop that defines the boundary. It is instructive to know that the transmitter and the receiver unit are functioning properly prior to undertaking the task of attempting to locate a problem in the buried wire loop. However, presently available electronic pet containment systems do not offer the end-user an easy way to verify the correct operation of the transmitter.

BRIEF SUMMARY OF THE INVENTION

A method and apparatus for testing the proper operation of an electronic pet containment transmitter is provided. The transmitter includes an internal short loop antenna that is used to activate the receiver unit when it is brought into close proximity of the transmitter.

The electronic animal containment system includes a transmitter that produces an electromagnetic containment signal, which defines the containment area. A wire-loop connected to the transmitter defines the boundary of the containment area and serves as a broadcast antenna for the containment signal. The animal is contained within the containment area through the use of the receiver unit, which is carried by the animal. The containment area defines three zones. The first zone is a safe zone where the animal receives no warnings or corrections. The next zone is a warning zone where the animal receives a cue, which is intended to warn the animal that it approaching the limits of the containment area. If the animal ignores the warning and enters a correction zone, the animal receives a corrective stimulus, which is intended to deter the animal from further movement towards the limits of the containment area.

The transmitter includes a housing that defines an access point configured to receive the receiver unit electrodes, thereby bringing them into close proximity to the internal short loop antenna. The operator selects whether the short loop antenna or the standard broadcast antenna is active.

The transmitter circuitry includes a controller/processor that coordinates the various functions of the transmitter. In communication with the controller/processor are a clock generator, a correction level selector, a broadcast range selector, a broadcast frequency selector, an operation mode selector, a power circuit, an audio output device, and a broadcast circuit. A loop selector routs the output of broadcast circuit to a selected transmission antenna, either the main loop(s) or a short loop antenna for testing. In addition, the loop selector electrically connects a pair of receiver electrode contact points to an operation indicator.

BRIEF DESCRIPTION OF THE SEVERAL VIEWS OF THE DRAWINGS

The above-mentioned features of the present invention will become more clearly understood from the following detailed description of the invention, read together with the drawings in which.

DETAILED DESCRIPTION OF THE INVENTION

A method and apparatus for testing the proper operation of an electronic pet containment transmitter, or electronic pet containment system tester is described and shown in the figures. The transmitter includes an internal short loop antenna that is used to activate the receiver unit when it is brought into close proximity of the transmitter.

Figure 1:
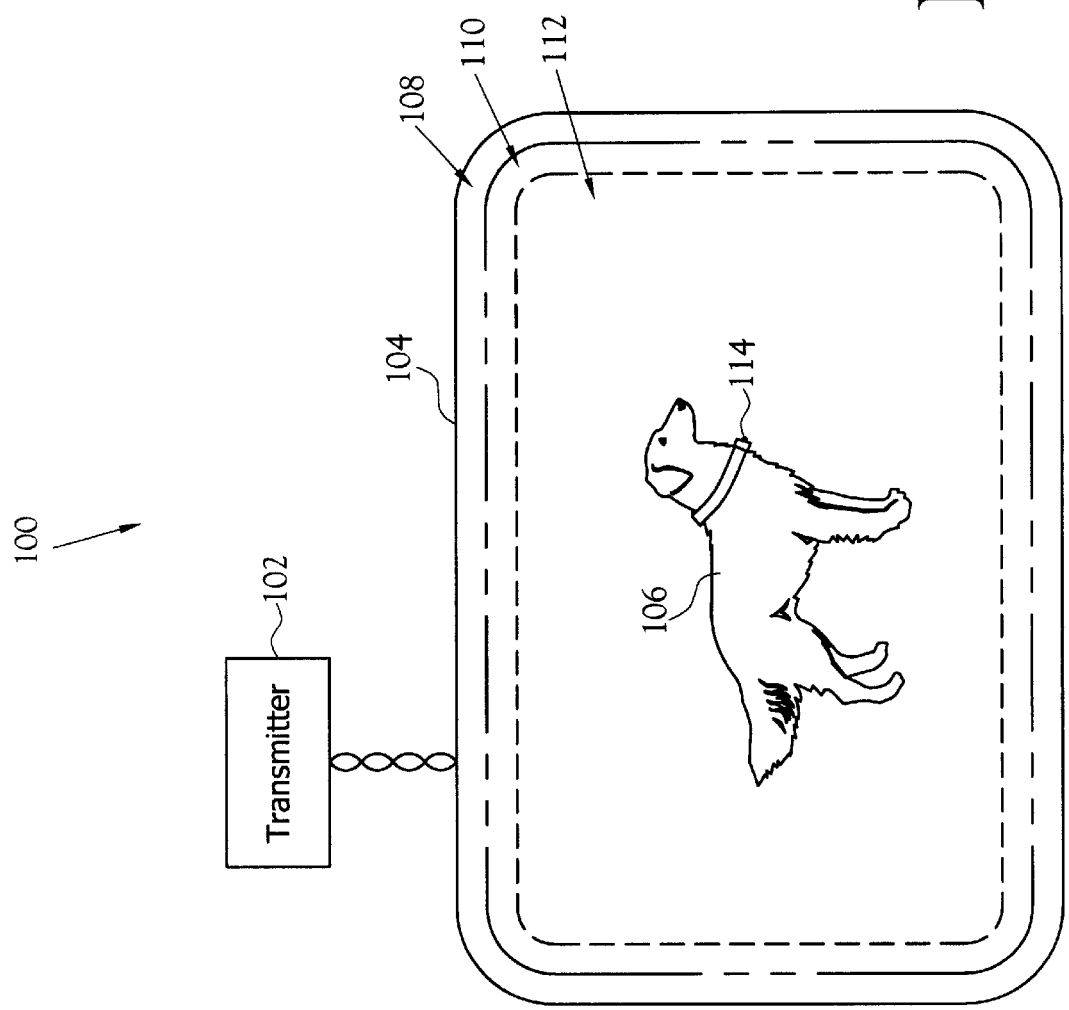
FIG. 1 is an illustration of a typical electronic containment system application.

FIG. 1 illustrates one embodiment of an electronic animal containment system 100. The electronic animal containment system 100 includes a transmitter 102 that produces an electromagnetic containment signal, which defines the containment area 104. A wire-loop connected to the transmitter 102 defines the boundary of the containment area 104 and serves as a broadcast antenna for the containment signal. The animal 106 is contained within the containment area 104 through the use of the receiver unit 114, which is carried by the animal 106. The containment area 104 defines three zones. The first zone is a safe zone 112 where the animal 106 receives no warnings or corrections. As the animal 106 approaches the wire-loop 104, it enters the warning zone 110. While in the warning zone 110, the animal 106 receives a cue, which is known to those skilled in the art, that is intended to warn the animal 106 that it approaching the limits of the containment area 104. If the animal 106 ignores the warning and enters the correction zone 108, the animal 106 receives a corrective stimulus, which is known to those skilled in the art, that is intended to deter the animal 106 from further movement towards the limits of the containment area 104. While the illustrated embodiment is a wire-based containment system, those skilled in the art will recognize that a wireless containment system can be used with the receiver unit 114 without departing from the spirit and scope of the present invention. Further, those skilled in the art will recognize that the transmitter can be adapted to drive more than one wire-loop allowing for multiple containment zones.

Figure 2:
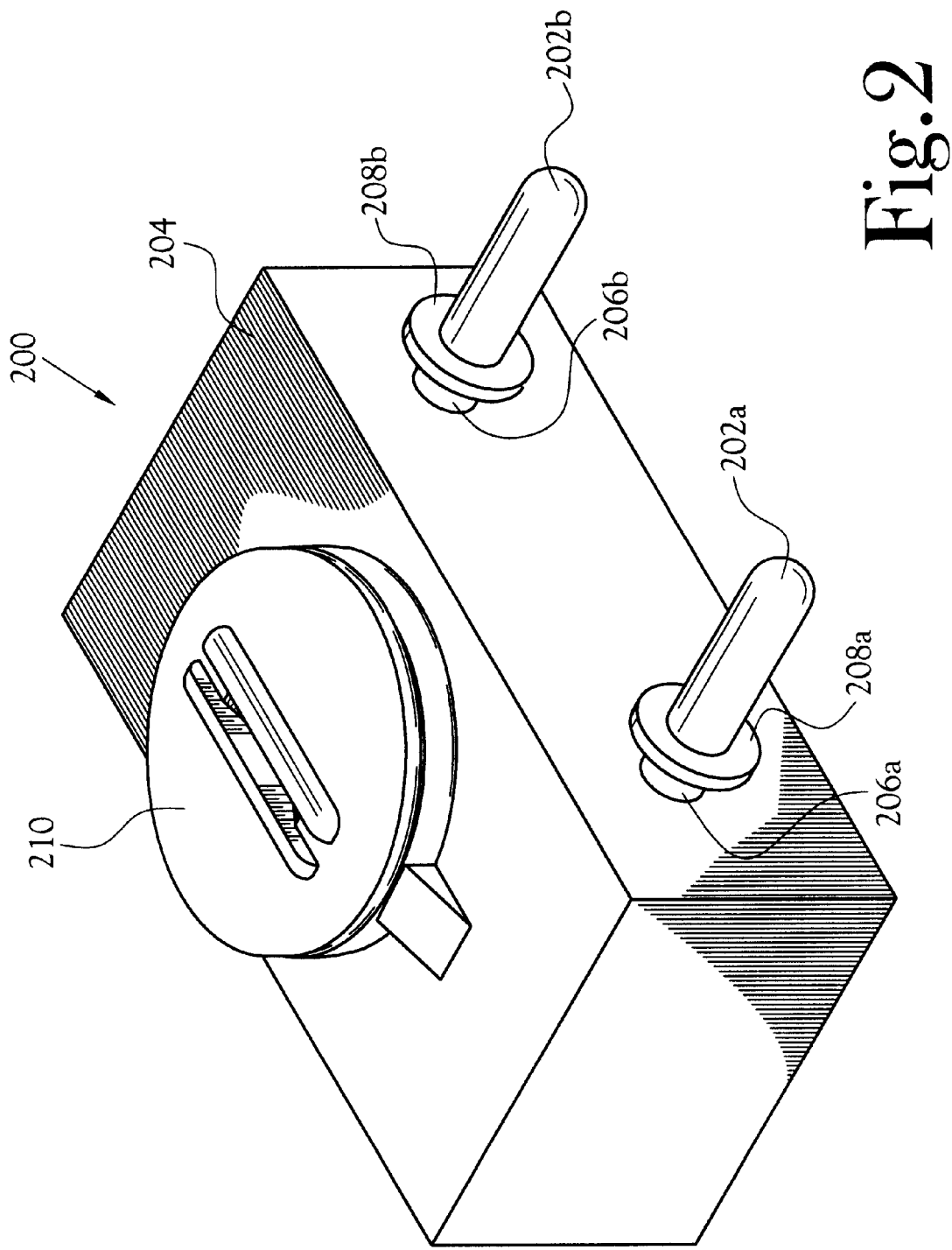
FIG. 2 is an illustration of a receiver unit carried by an animal in an electronic containment system.

FIG. 2 depicts one embodiment of the receiver unit 200. The receiver unit 200 includes a pair of electrodes 202a, 202b extending from the housing 204 of the receiver unit 200. In the illustrated embodiment, the electrodes 202a, 202b are removable and are adapted to pass through openings in a collar (not shown) so as to secure the receiver unit 200 to the collar. Typically, each electrode 202a, 202b has a threaded end that cooperates with a threaded receptor 206 of receiver unit 200, which provides the necessary mechanical and electrical contact. A locking washer 208a, 208b serves to resist unintended disengagement of the electrode 202a, 202b from the receiver unit 200 and is sized to have a diameter substantially greater than the openings in the collar such that the collar is retained between the locking washer 208a, 208b and the receiver unit 200 when the electrode 202a, 202b is engaged. Those skilled in the art will recognize that the manner in which the receiver unit 200 is secured to a collar can vary without departing from the scope and spirit of the present invention. For example, the collar can be threaded through a series of buckles molded into or secured to the housing 204. Other features of the receiver unit 200, including the battery opening 210, adjustment mechanisms (not shown), and audible and/or visual indicators (not shown) are commonly known to those skilled in art and dictated by the desired functionality of the receiver unit 200 and can be included without departing from the scope and spirit of the present invention.

Figure 3:
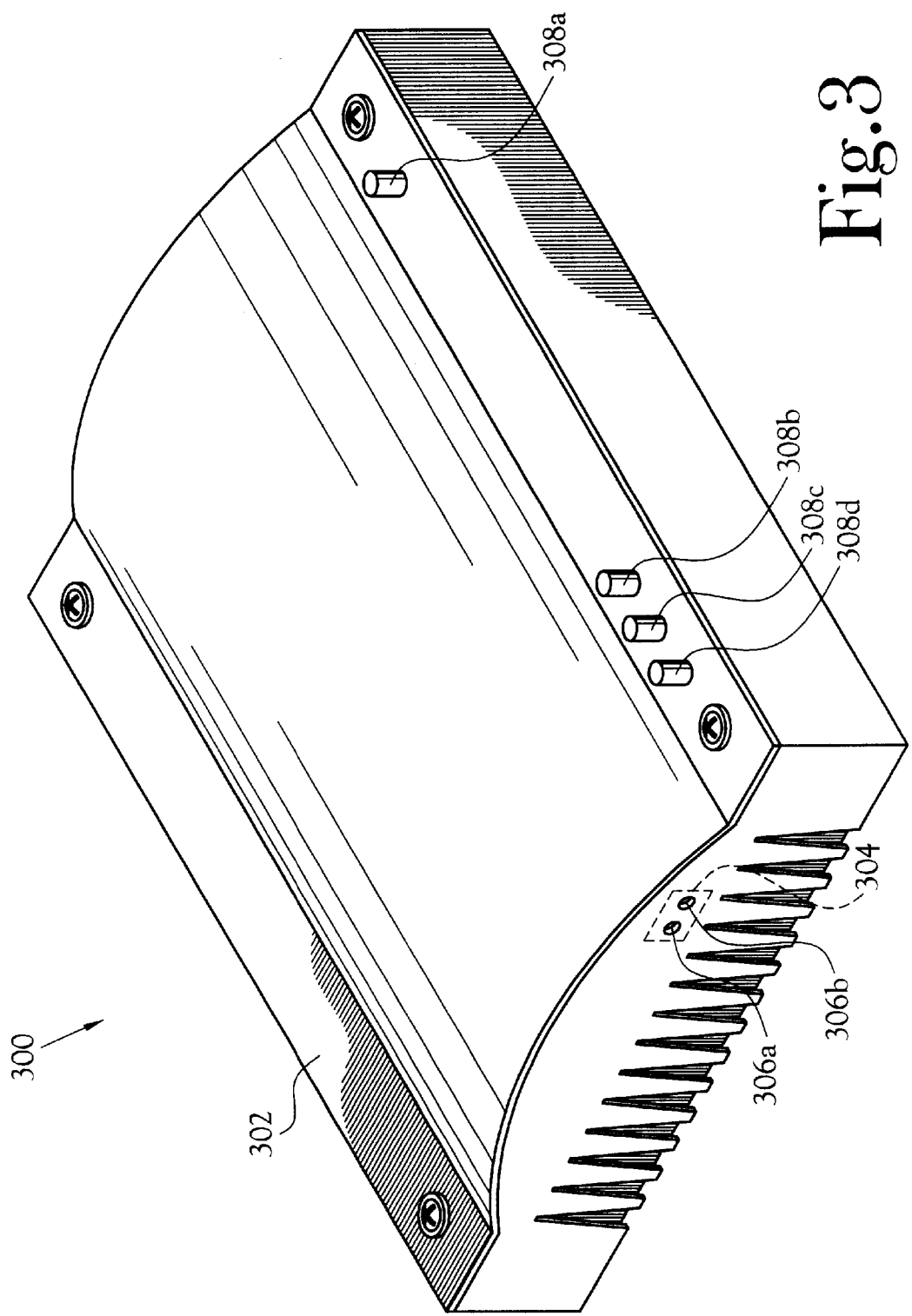
FIG. 3 is an illustration of a transmitter unit for an electronic containment system of the present invention.

FIG. 3 depicts one embodiment of the transmitter 300. The transmitter 300 includes a housing 302 that contains the electronic circuitry (not visible in FIG. 3). The housing 302 defines an access point 304 configured to receive the receiver unit electrodes 202a, 202b, thereby bringing them into close proximity to the internal short loop antenna (not visible in FIG. 3). In the illustrated embodiment, the access point 304 includes a pair of openings 306a, 306b spaced to receive the electrodes of the receiver unit. The operator selects whether the short loop antenna or the standard broadcast antenna is active. Depending upon the design objects, the switch design and implementation can be selected from a number of designs and implementations known to those skilled in the art without departing from the scope and spirit of the present invention. For example, the switch may be externally located and weather-sealed, located behind an access port, internally located, or manipulated remotely, such as a magnetic reed switch operated by a magnetic key. In one embodiment, the switch is a microswitch activated when the electrodes engage the access point 304.

The transmitter 300 also includes a number of lamps, or visual indicators, 308a, 308b, 308c, 308d that provide visual indication of various conditions of the transmitter 300. For example, in the illustrated embodiment, the transmitter 300 includes a short loop test indicator 308a, a power indicator 308b, a first main loop indicator 308c, and a second main loop indicator 308d. Again, depending upon the design objects, the implementation of the indicators 308a, 308b, 308c, 308d can be selected from a number of implementations known to those skilled in the art without departing from the scope and spirit of the present invention. For example, the visual indictors 308a, 308b, 308c, 308d can be replaced or supplemented with audible indicators. Further, the visual indicators 308a, 308b, 308c, 308d can be upgraded to provide additional information, such as with bar LEDs, multiple-segment LED displays, LCD displays, or other text capable displays.

Figure 4:
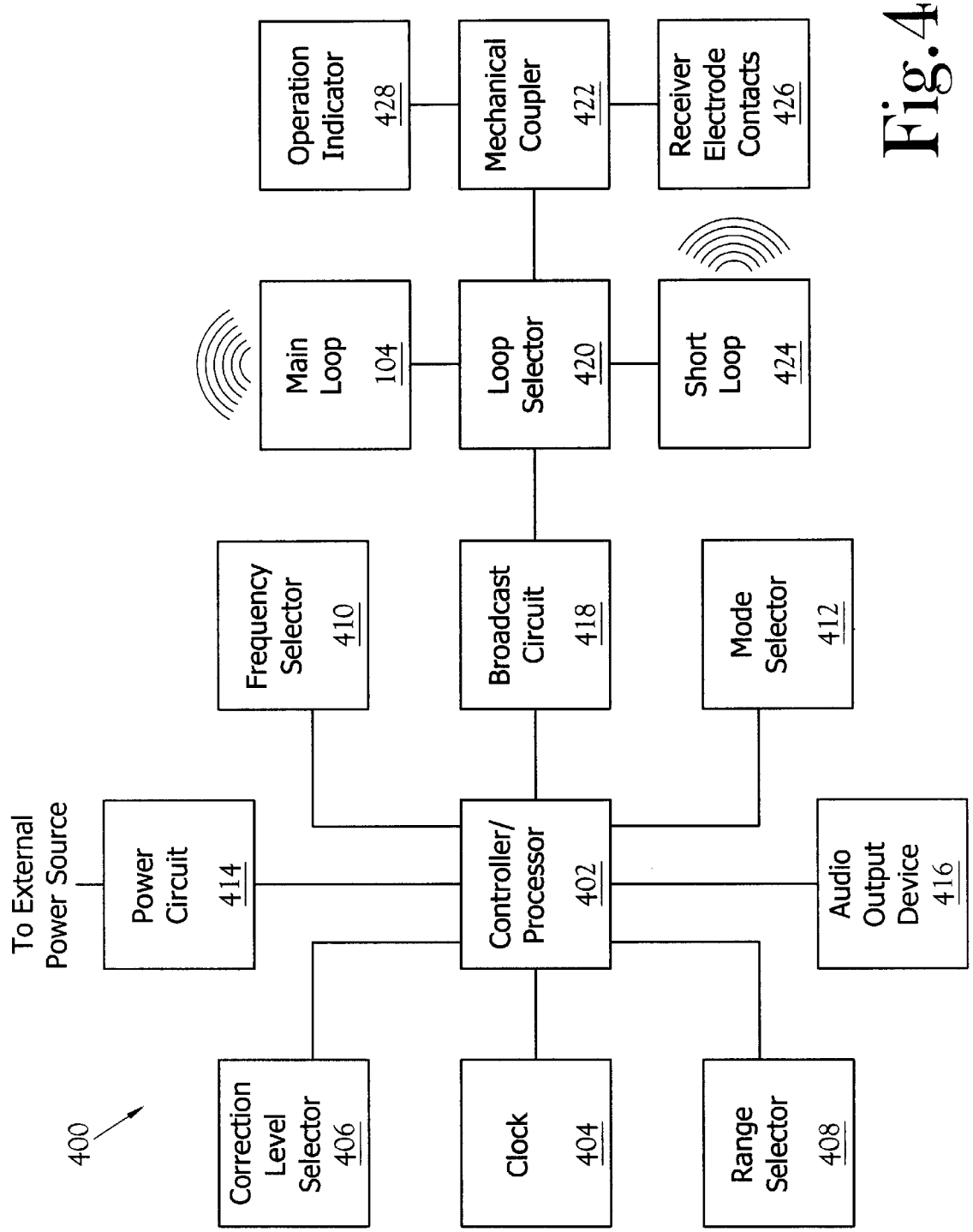
FIG. 4 is a block diagram of the transmitter unit circuit of the present invention.

FIG. 4 illustrates a block diagram of the various functions of the electronic circuitry 400 of the transmitter 300 of the present invention. The electronic circuitry 400 includes a controller/processor 402 that coordinates the various functions provided by the electronic circuitry 400. In communication with the controller/processor 402 are a clock generator 404, a correction level selector 406, a broadcast range selector 408, a broadcast frequency selector 410, an operation mode selector 412, a power circuit 414, an audio output device 416, and a broadcast circuit 418. Those skilled in the art will recognize that the correction level selector 406, the broadcast range selector 408, the broadcast frequency selector 410, the operation mode selector 412, and the audio output device 416 are directly related to extended features of the transmitter 300 of the present invention. Such features are not necessary to achieve the present invention. The clock generator 404 and the power circuit 414 are common components of a typical transmitter. The implementation of these extended features and common components is well known to those skilled in the art.

A loop selector 420 routs the output of broadcast circuit 418 to a selected transmission antenna. In the illustrated embodiment, the loop selector 420 cooperates with a mechanical coupler 422 to substitute a testing apparatus for the main wire-loop 104 to verify communication between the transmitter 300 and the receiver unit 200. When engaged, the loop selector 420 electrically shunts the signal from the broadcast circuit 418 through a short loop 424, thereby bypassing main wire-loop(s) 104. In one embodiment, the short loop 424 is located in or on the transmitter 300 proximate to the access point 304. In addition, the loop selector 420, through the mechanical coupler 422, electrically connects a pair of receiver electrode contact points 426 to an operation indicator 428. Those skilled in the art will recognize that the short loop could also be located external to the transmitter without departing from the scope and spirit of the present invention.

Figure 5:
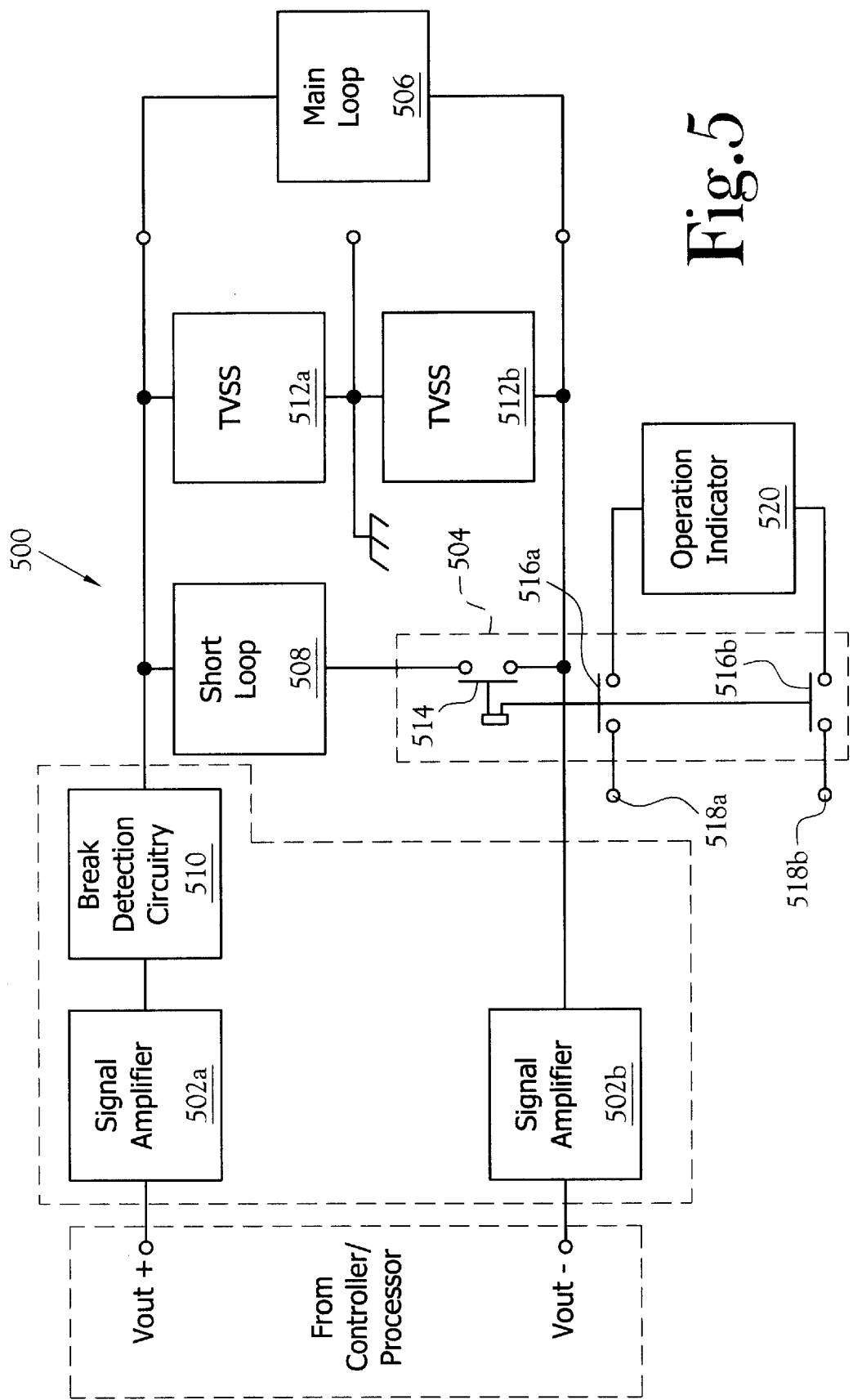
FIG. 5 is a block diagram of the short loop antenna test circuit.

FIG. 5 illustrates the test circuit 500 in greater detail. The output of the controller/processor 402 feeds a pair of signal amplifiers 502a, 502b. The output of the pair of signal amplifiers 502a, 502b is routed via the loop selector 504 to either the main loop 506 or the short loop 508. Coupled to the signal amplifiers 502a, 502b is a break detection circuit 510 that is responsive to current interruptions in the main wire-loop(s) 104. An interruption indicates a breakage in the main-loop 104. In one embodiment, the break detection circuit 510 includes a current sensing transformer. In the illustrated embodiment, the main loop 506 is protected with transient voltage surge suppression (TVSS) circuits 512a, 512b.

The loop selector 504 includes a normally open switch 514 connecting the output lines from each signal amplifier 502a, 502b. When the switch 514 is closed, the output lines from the pair of signal amplifiers 502a, 502b are shorted bypassing the main loop 506 and routing the output signal through the short loop 508.

The loop selector 504 also includes a switching mechanism 516 that connects the electrode contact points 518*a*, 518*b* to the inputs of an operation indicator 520. In one embodiment, the switching mechanism 516 is a mechanical switching device that physically connects the electrode contact points 518*a*, 518*b* to the operation indicator 520. Those skilled in the art will recognize that an equally effective design can be achieved using other switch types intended to make and break electrical connections without departing from the scope and spirit of the present invention.

By way of example, the operation of the test circuit 500 is described. To test the operation of the system, the transmitter 300 is activated and placed in a normal operation mode. The receiver unit electrodes 202*a*, 202*b* are brought into contact with the electrode contact points 518*a*, 518*b*. The loop selector 504 is depressed thereby sending the broadcast signal through the short loop antenna 508. Simultaneously, the electrode contact points 518*a*, 518*b* are electrically connected to the operation indicator 520. If the receiver unit 200 properly receives and decodes the broadcast signal, a correction stimulus is generated. The voltage that is produced at the receiver unit electrodes 202*a*, 202*b* is conducted through the electrode contact points 518*a*, 518*b* to the operation indicator 520. In one embodiment, the operation indicator 520 is a neon lamp having a 50-volt activation potential. When produced, the correction stimulus directly drives the neon lamp with sufficient voltage to illuminate the neon lamp. The lighting of the neon lamp indicates proper functioning and communication between the transmitter 300 and the receiver unit 200.

Those skilled in the art will recognize that the short loop antenna can be implemented using a variety of components and positioned in a number of differing locations without departing from the scope and spirit of the present invention. The primary characteristics of the short loop antenna are that it is located on or within, i.e., integral to, the transmitter unit and that it has a small area or footprint. In one embodiment, the short loop antenna has a perimeter smaller than the transmitter and typically on the order of a couple of inches. For example, the short loop antenna can be implemented as a trace drawn on a circuit board within the transmitter unit, an electrical trace drawn on the transmitter unit housing, either internally or externally, or a stand alone wire-loop antenna located on or within the transmitter unit housing.

In the above example, a number of details have been described concerning the design and operation of the electronic pet containment system tester. Those skilled in the art will recognize that other implementations can be utilized without departing from the scope and spirit of the present invention. For example, the neon lamp test fixture is a relatively simple device that is capable of verifying that a voltage in excess of 50 volts is being produced by the receiver unit. However, by implementing a basic voltage meter, the output of the receiver unit is measured with precision allowing verification of the proper operation of the correction generation circuitry. The mechanical connection between the electrode connection points and the operation indicator can be implemented with an electrical connection.

While a preferred embodiment has been shown and described, it will be understood that it is not intended to limit the disclosure, but rather it is intended to cover all modifications and alternate methods falling within the spirit and scope of the invention as defined in the appended claims.

Having thus described the aforementioned invention, I claim:

1. An apparatus for testing an electronic pet containment system including a collar unit adapted to deliver an electrical shock stimulus to an animal via a pair of electrodes and a transmitter unit, said apparatus comprising:
   a transmitter circuit associated with the transmitter unit, said transmitter circuit producing an electronic confinement signal;
   an antenna associated with the transmitter unit, said antenna adapted to broadcast said electronic confinement signal;
   a switch associated with the transmitter unit, said switch electrically coupling and uncoupling said antenna and said transmitter circuit;
   a pair of contact points associated with the transmitter unit, said pair of contact points positioned such that each of said pair of contact points makes electrical contact with one of the pair of electrodes when the pair of electrodes is brought into contact with said pair of contact points; and
   an indicator associated with the transmitter unit, said indicator in electrical contact with said pair of contact points, said indicator responsive to a voltage differential between said pair of contact points.

2. The apparatus of claim 1 wherein said indicator is a neon lamp having a predetermined activation voltage.

3. The apparatus of claim 1 wherein said antenna has a perimeter smaller than the transmitter unit.

4. The apparatus of claim 1 wherein said transmitter circuit is dispose upon a circuit board, said antenna being disposed upon said circuit board.

5. The apparatus of claim 1 further comprising a switch in communication between said pair of contact points and said indicator.

6. The apparatus of claim 5 wherein said switch electrically couples and uncouples said pair of contact points and said indicator.

7. The apparatus of claim 5 wherein said switch mechanically couples and uncouples said pair of contact points and said indicator.

8. The apparatus of claim 1 further comprising a housing associated with said transmitter unit, said housing defining at least one opening adapted to receive said pair of electrodes, said at least one opening located proximate to said antenna.

9. The apparatus of claim 8 wherein said antenna is disposed upon said housing.

10. The apparatus of claim 8 wherein said antenna is disposed within said housing.

11. An electronic pet containment system comprising:
    a receiver unit having a pair of electrodes;
    a transmitter unit having a transmitter;
    a boundary antenna connected to said transmitter, said boundary antenna bounding a containment area;
    a testing antenna associated with said transmitter unit, said testing antenna not bounding the confinement area;
    a switch associated with the transmitter unit, said switch electrically coupling and uncoupling said testing antenna to said transmitter;
    a pair of contacts disposed on said transmitter unit to engage said pair of electrodes during testing; and
    an indicator located on the transmitter unit and in electrical communication with said pair of contacts, said indicator producing an indication of the proper functioning of said transmitter during testing.

12. The apparatus of claim 11 wherein said testing antenna is located within said transmitter unit.

13. The apparatus of claim 11 wherein said testing antenna is located on said transmitter unit.

14. The apparatus of claim 11 wherein said transmitter includes a circuit board, said testing antenna is a trace upon said circuit board.

15. The apparatus of claim 11 wherein said indicator is activated by a voltage produced by said receiver unit in response to a signal received from said testing antenna.

16. A transmitter for an electronic pet containment system, said electronic pet containment system including a receiver unit having a pair of electrodes, said transmitter comprising:
- a pair of connectors for attaching a wire-loop antenna, the wire-loop antenna used to bound a containment area;
- a transmitter circuit;
- a testing antenna in electrical communication with said transmitter circuit;
- a pair of contacts configured to make electrical contact with said pair of electrodes during testing; and
- an indicator producing an indication of the proper functioning of said transmitter during testing, said indicator being in an electrical circuit with said pair of contacts.

17. The apparatus of claim 16 wherein said testing antenna is located within transmitter.

18. The apparatus of claim 16 wherein said testing antenna is located on said transmitter.

19. The apparatus of claim 16 wherein said transmitter unit includes a circuit board and said testing antenna is a trace upon said circuit board.

20. The apparatus of claim 16 wherein said indicator is activated by a voltage applied to said pair of contacts.

21. The apparatus of claim 16 wherein said testing antenna is electrically connected to said transmitter circuit when said pair of contacts is engaged.

22. The apparatus of claim 16 further comprising a switch for selectively electrically connecting said testing antenna to said transmitter circuit.

23. The apparatus of claim 16 wherein said indicator is electrically connected to said pair of contacts when said pair of contacts is engaged.

24. The apparatus of claim 16 further comprising a switch for selectively electrically connecting said pair of contacts and said indicator.

* * * * *